(12) United States Patent
Chen et al.

(10) Patent No.: US 11,848,143 B2
(45) Date of Patent: Dec. 19, 2023

(54) ELECTRONIC DEVICE AND METHOD FOR MANUFACTURING THE SAME

(71) Applicant: Advanced Semiconductor Engineering, Inc., Kaohsiung (TW)

(72) Inventors: Yunghsun Chen, Kaohsiung (TW); Huang-Hsien Chang, Kaohsiung (TW); Shao Hsuan Chuang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 408 days.

(21) Appl. No.: 17/065,482

(22) Filed: Oct. 7, 2020

(65) Prior Publication Data

US 2022/0108826 A1   Apr. 7, 2022

(51) Int. Cl.
*H01F 27/24* (2006.01)
*H01F 27/28* (2006.01)
*H01F 27/40* (2006.01)
*H01F 41/04* (2006.01)
*H01G 4/30* (2006.01)

(52) U.S. Cl.
CPC .......... *H01F 27/2804* (2013.01); *H01F 27/24* (2013.01); *H01F 27/40* (2013.01); *H01F 41/041* (2013.01); *H01G 4/30* (2013.01)

(58) Field of Classification Search
USPC ............... 361/270; 257/531, 21.022, 29.002; 438/381
See application file for complete search history.

(56) References Cited

U.S. PATENT DOCUMENTS

2013/0043557 A1*  2/2013  Cho ...................... H01L 21/768
                                                   257/E21.022
2013/0140579 A1*  6/2013  Sharifi .............. H01L 23/53252
                                                   257/E23.141
2017/0140862 A1*  5/2017  Yun ..................... H01F 27/2804

* cited by examiner

*Primary Examiner* — Timothy J Thompson
*Assistant Examiner* — Guillermo J Egoavil
(74) *Attorney, Agent, or Firm* — FOLEY & LARDNER LLP

(57) ABSTRACT

An electronic device and a method for manufacturing an electronic device are provided. The electronic device includes an inductor. The inductor includes a plurality of line portions and a plurality of plate portions connected to the plurality of line portions. The line portions and the plate portions form a coil concentric to a horizontal axis.

18 Claims, 16 Drawing Sheets

ELECTRONIC DEVICE AND METHOD FOR MANUFACTURING THE SAME

BACKGROUND

1. Technical Field

The present disclosure relates to an electronic device and a method for manufacturing an electronic device.

2. Description of the Related Art

Due to increased developments in various Radio Frequency (RF) devices and the applications thereof, inductors and capacitors have been integrated into the device packages to reduce impedance loss. Therefore, there is an increasing need to advance the research concerning integration of such components into device packages.

SUMMARY

In one or more embodiments, an electronic device includes an inductor. The inductor includes a plurality of line portions and a plurality of plate portions connected to the plurality of line portions. The line portions and the plate portions form a coil concentric to a horizontal axis.

In one or more embodiments, an electronic device includes an inductor and a capacitor. The inductor includes a coil concentric to a horizontal axis. The capacitor contacts the inductor. The capacitor is surrounded by the coil of the inductor.

In one or more embodiments, a method for manufacturing an electronic device includes the following operations: forming a first stack of conductive layers and dielectric layers, wherein the conductive layers and dielectric layers are arranged alternatingly; forming a capacitor structure on the first stack of conductive layers and dielectric layers; forming a second stack of conductive layers and dielectric layers on the capacitor structure; and forming a plurality of conductive lines electrically connecting the conductive layers of the first stack and the conductive layers of the second stack.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
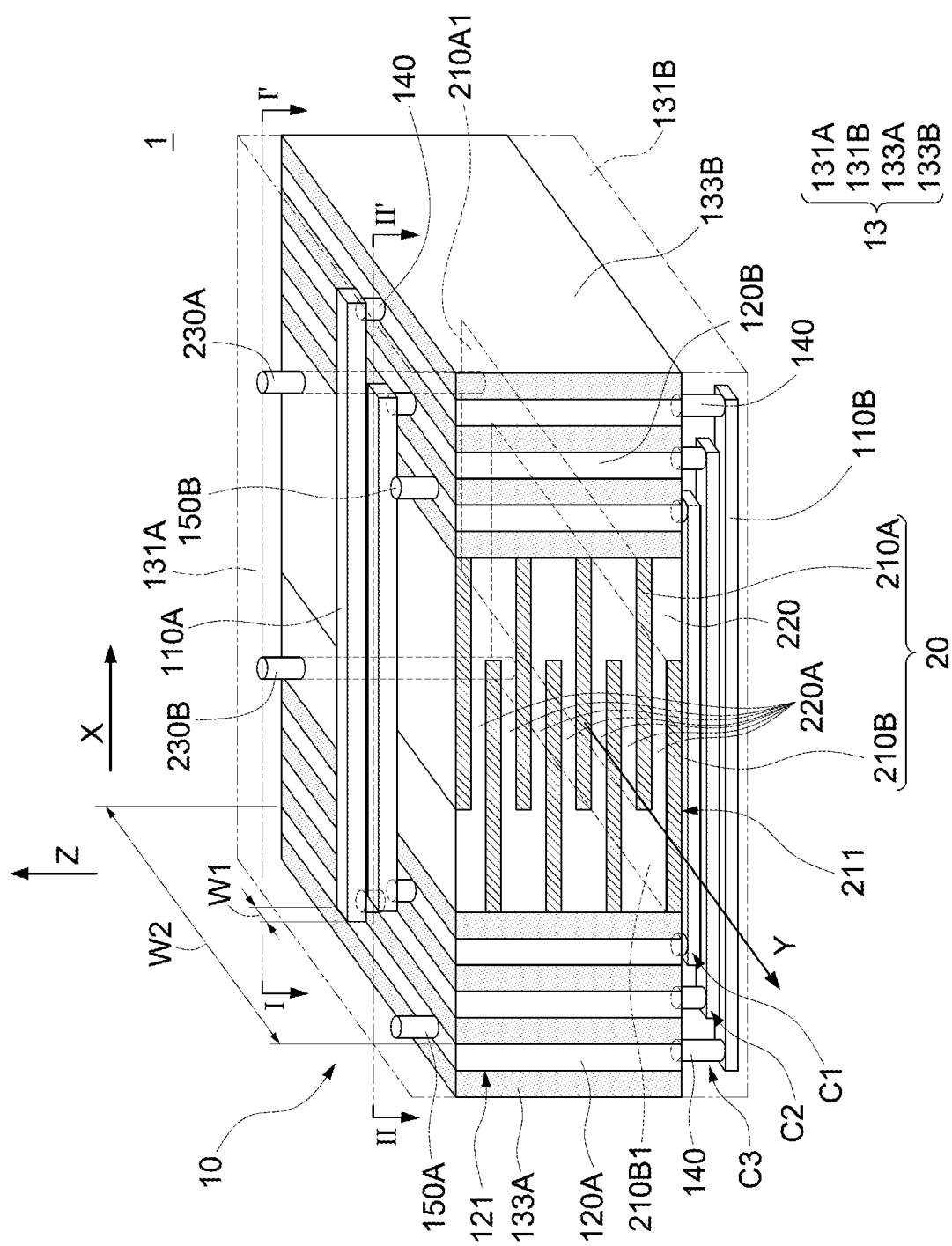
FIG. 1 illustrates a three-dimensional diagram of an electronic device in accordance with some embodiments of the present disclosure.

The following disclosure provides for many different embodiments, or examples, for implementing different features of the provided subject matter. Specific examples of components and arrangements are described below. These are, of course, merely examples and are not intended to be limiting. In the present disclosure, reference to the formation or disposal of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

FIG. 1 illustrates a three-dimensional diagram of an electronic device 1 in accordance with some embodiments of the present disclosure. The electronic device 1 includes an inductor 10 and a capacitor 20. It should be noted that some of the components in FIG. 1 are shown in a perspective view for clarity.

The inductor 10 includes a coil concentric to a horizontal axis Y. In some embodiments, the inductor 10 includes a plurality of line portions (e.g., line portions 110A and 110B), a plurality of plate portions (e.g., plate portions 120A and 120B), a dielectric structure 13, a plurality of connecting elements 140, and terminals 150A and 150B.

In some embodiments, the line portions 110A and 110B are connected to the plate portions 120A and 120B. In some embodiments, the line portions 110A and 110B and the plate portions 120A and 120B form the coil that is concentric to the horizontal axis Y. In some embodiments, the line portions 110A and 110B and the plate portions 120A and 120B are arranged alternatingly around the horizontal axis Y.

In the cases where an inductor is constructed by lines (e.g., RDLs) connected to pillars so as to form a coil that is composed of alternatingly arranged lines and pillars, the manufacturing process of the pillars is complicated and difficult, resulting in a relatively low yield. In addition, vertical pillars may easily collapse and/or fracture, such that disconnection may easily occur within the coil, and thus the inductor may malfunction. In contrast, according to some embodiments of the present disclosure, by utilizing plate portions 120A and 120B instead of pillars as connections between the line portions 110A and 110B—so as to form the coil of the inductor 10—complicated and difficult manufacturing processes of forming pillars can be avoided, and the yield of the electronic device 1 can be increased. In addition, since the plate portions 120A and 120B do not easily collapse or fracture, such arrangement can provide a relatively robust structure of the inductor 10, and thus the stability and reliability of the inductor 10 as well as the electronic device 1 can be significantly increased.

In some embodiments, the coil of the inductor 10 includes a plurality of turns (e.g., turns C1-C3), staring from the terminal 150B to the terminal 150A. In some embodiments, one of the line portions 110A, one of the line portions 110B, one of the plate portions 120A and one of the plate portions 120B form a turn (e.g., the turns C1 and C2) of the coil of the inductor 10. In some embodiments, the last turn of the coil (e.g., the turn C3) may include one of the line portions 110A, one of the line portions 110B and one of the plate portions 120A. The first turn (e.g., C1) and the last turn (e.g., C3) connect the terminal 150B and 150A, respectively, for electrical connection.

In some embodiments, the line portions 110A and 110B have a width W1 along the horizontal axis Y, the plate portions 120A and 120B have a width W2 along the horizontal axis Y, and the width W2 is greater than the width W1. In some embodiments, a ratio W2/W1 of the width W2 to the width W1 is greater than about 3. In some embodiments, the ratio W2/W1 of the width W2 to the width W1 is from about 3 to about 30. In some embodiments, the ratio W2/W1 of the width W2 to the width W1 may be 3, 5, 10, 15, 20, 25 or 30.

The line portions 110A are disposed above the capacitor 20 and the plate portions 120A and 120B. In some embodiments, the line portions 110A are substantially parallel to each other. In some embodiments, the line portions 110A are at substantially the same elevation. In some other embodiments, at least one of the line portions 110A may be at an elevation different from that of the other line portions 110A (not shown in FIG. 1). The line portions 110B are disposed below the capacitor 20 and the plate portions 120A and 120B. In some embodiments, the line portions 110B are substantially parallel to each other. In some embodiments, some or all of the line portions 110B are at different elevations. In some other embodiments, the line portions 110B may be at substantially the same elevation (not shown in FIG. 1). In some embodiments, the line portions 110A and 110B are extending along a direction X (i.e., along another horizontal axis) that is substantially perpendicular to the horizontal axis Y. In some embodiments, the line portions 110A and 110B may be or include a conductive material such as a metal or metal alloy or other suitable conductive material(s). Examples include gold (Au), silver (Ag), aluminum (Al), copper (Cu), or an alloy thereof.

The plate portions 120A and the plate portions 120B are disposed on two opposing lateral surfaces of the capacitor 20, respectively. In some embodiments, the plate portions 120A are substantially parallel to each other. In some embodiments, the plate portions 120B are substantially parallel to each other. In some embodiments, the plate portions 120A are stacked along the direction X. In some embodiments, the plate portions 120B are stacked along the direction X. In some embodiments, the plate portions 120A and 120B are arranged between the line portions 110A and the line portions 110B (i.e., the line portions 110A and the line portions 110B are disposed above and below the plate portions 120A and 120B, respectively). In some embodiments, the line portions 110A and 110B are extending along the direction X, and the direction X may be substantially perpendicular to a surface (e.g., surface 121) of the plate portions 120A and 120B. In some embodiments, the line portions 110A and 110B are extending along the direction X, and the direction X may be substantially parallel to a normal line of one or more of the planes (e.g., the surface 121) of the plate portions 120A and 120B. In some embodiments, each of the plate portions 120A and 120B may have a thickness along the direction X, and the thickness may be from about 0.8 µm to about 1.2 µm (e.g., 0.8 µm, 0.9 µm, 1 µm, 1.1 µm or 1.2 µm). In some embodiments, the thickness of each of the plate portions 120A and 120B may be about 1 µm. In some embodiments, the plate portions 120A and 120B may be or include a conductive material such as a metal or metal alloy or other suitable conductive material(s). Examples include gold (Au), silver (Ag), aluminum (Al), copper (Cu), or an alloy thereof.

In some embodiments, the dielectric structure 13 of the inductor 10 includes dielectric layers 131A, 131B, 133A and 133B. The dielectric layer 133A may include a plurality of layers arranged alternatingly with the plate portions 120A. The dielectric layer 133B may include a plurality of layers arranged alternatingly with the plate portions 120B. The dielectric layer 131A is disposed above the capacitor 20, the plate portions 120A and 120B and the dielectric layers 133A and 133B. The dielectric layer 131B is disposed below the capacitor 20, the plate portions 120A and 120B and the dielectric layers 133A and 133B. In some embodiments, the line portions 110A are disposed on or embedded in the dielectric layer 131A and electrically connected to respective ones of the plate portions 120A and 120B through the connecting elements 140 penetrating the dielectric layer 131A. The line portions 110B are disposed on or embedded in the dielectric layer 131B and electrically connected to respective ones of the plate portions 120A and 120B through the connecting elements 140 penetrating the dielectric layer 131B. In some embodiments, the dielectric layers 131A, 131B, 133A and 133B are connected and define a space to accommodate the capacitor 20. In some embodiments, the coil of the inductor 10 is partially or fully embedded in the dielectric structure 13. In some embodiments, the line portions 110A and 110B and the plate portions 120A and 120B of the inductor 10 are embedded in the dielectric layers 131A, 131B, 133A and 133B, respectively. In some embodiments, the line portions 110A are separated from the line portions 110B by the dielectric structure 13. In some embodiments, the plate portions 120A are separated from the plate portions 120B by the dielectric structure 13. In some embodiments, the line portions 110A are separated from each other by the dielectric layer 131A. In some embodiments, the line portions 110B are separated from each other by the dielectric layer 131B. In some embodiments, the plate portions 120A are separated from each other by the dielectric layer 133A. In some embodiments, the plate portions 120B are separated from each other by the dielectric layer 133B.

In some embodiments, each layer of the dielectric layers 133A and 133B may have a thickness along the direction X, and the thickness may be from about 300 nm to about 700 nm (e.g., 300 nm, 400 nm, 500 nm, 600 nm or 700 nm). In some embodiments, the thickness of each layer of the dielectric layers 133A and 133B may be about 500 nm. In some embodiments, each layer of the dielectric layers 131A, 131B, 133A and 133B may be or include one or more organic materials (e.g., phosphoric anhydride (PA), polyimide (PI), polybenzoxazole (PBO), carbon nanofibers (CNF), epoxy resin, and an epoxy-based material)), or one or more inorganic materials (e.g., silicon oxide, silicon nitride, and tantalum oxide). According to some embodiments of the present disclosure, with the aforesaid design of the thickness of the dielectric layers (e.g., 133A and 133B) between the conductive layers (e.g., 120A and 120B) of the coil of the inductor 10, sufficient insulation between the conductive layers of the coil of the inductor 10 can be provided while keeping the size/volume of the electronic device 1 minimized to a satisfactory level.

In some embodiments, the connecting element 140 may be a via, a bump, a pillar, etc., and connects one of the line portions (e.g., 110A or 110B) to one of the plate portions (e.g., 120A or 120B). In some embodiments, each of the connecting elements 140 connect a line portion to an adjacent plate portion so as to connect the line portions and the plate portions that are arranged alternatingly to form the coil of the inductor 10. In some embodiments, the connecting elements 140 may be or include a conductive material such as a metal or metal alloy or other suitable conductive material(s). Examples include gold (Au), silver (Ag), aluminum (Al), copper (Cu), or an alloy thereof.

In some embodiments, the terminal 150A is connected to one of the plate portions 120A, and the terminal 150B is connected to one of the plate portions 120B. In some embodiments, the plate portion 120A that is connected to the terminal 150A is connected to one of the connecting elements 140 at an opposite end. In some embodiments, the plate portion 120B that is connected to the terminal 150B is connected to another one of the connecting elements 140 at an opposite end. In some embodiments, the terminals 150A and 150B serve as input/output terminals of the coil of the inductor 10.

In some embodiments, the capacitor 20 contacts the inductor 10. In some embodiments, the capacitor 20 is surrounded by the coil of the inductor 10. In some embodiments, the capacitor 20 directly contacts the dielectric structure 13 of the inductor 10. In some embodiments, the capacitor 20 directly contacts the dielectric layers 131A, 131B, 133A and 133B.

In the cases where an inductor and a capacitor are disposed separately on a substrate of a device package, the inductor and the capacitor both occupy spaces in the device package. In contrast, according to some embodiments of the present disclosure, the inductor 10 is integrated with the capacitor 20, the inductor 10 and the capacitor 20 may contact each other (for example, the capacitor 20 being surrounded by the dielectric structure of the inductor 10) and share the same metal layer(s) (i.e., RDL), and therefore, the space occupied by components (e.g., the inductor 10 and the capacitor 20) can be reduced, thereby reducing a size of the device package and increasing the flexibility of integration of various electronic components in the device package.

In some embodiments, the capacitor 20 includes a plurality of conductive layers (e.g., conductive layers 210A and 210B), a plurality of dielectric layers 220A, and connecting elements 230A and 230B. The connecting elements 230A and 230B may be conductive pillars, but are not limited thereto.

In some embodiments, the conductive layers 210A and 210B are stacked alternatingly and separated by the dielectric layers 220A. In some embodiments, the conductive layers 210A and 210B and the dielectric layers 220A are surrounded by the coil of the inductor 10. In some embodiments, the conductive layers 210A and 210B and the dielectric layers 220A are surrounded by the plurality of turns (e.g., the turns C1-C3) of the coil of the inductor 10. In some embodiments, the conductive layers 210A and 210B and the dielectric layers 220A are surrounded by the dielectric structure 13 of the inductor 10. In some embodiments, the conductive layers 210A and 210B and the dielectric layers 220A directly contact the dielectric structure 13 of the inductor 10. In some embodiments, the conductive layers 210A and 210B and the dielectric layers 220A are surrounded by the dielectric layers 131A, 131B, 133A and 133B. In some embodiments, a surface (e.g., surface 211) of the conductive layers 210A and 210B of the capacitor 20 is substantially perpendicular to the surface (e.g., the surface 121) of the plate portions 120A and 120B of the inductor 10. In some embodiments, the dielectric layers 220A may be integrally formed or one-piece formed as a dielectric structure 220. In some embodiments, the dielectric structure 220 is monolithic.

In some embodiments, the conductive layers 210A and 210B include one or more ferromagnetic materials (e.g., ferromagnetic conductive materials). In some embodiments, the conductive layers 210A and 210B are made of or include aluminum (Al), copper (Cu), iron (Fe), Kovar, or any combination thereof. In some embodiments, the dielectric layers 220A are made of or include a high-k dielectric material. In some embodiments, the dielectric layers 220A include one or more ferromagnetic materials (e.g., ferromagnetic dielectric materials). In some embodiments, the dielectric layers 220A are made of or include silicon nitride, silicon oxide, titanium oxide, tantalum oxide, or any combination thereof.

According to some embodiments of the present disclosure, the capacitor 20 is surrounded by the coil of the inductor 10 and includes one or more ferromagnetic materials (e.g., the conductive layers 210A and 210B include one or more ferromagnetic conductive materials and/or the dielectric layers 220A include one or more dielectric ferromagnetic materials), and thus the inductance of the inductor 10 can be increased without increasing the number of turns or increasing the length of the coil of the inductor 10.

In addition, according to some embodiments of the present disclosure, the surfaces (e.g., the surface 211) of the ferromagnetic conductive layers 210A and 210B of the capacitor 20 are substantially perpendicular to the surfaces (e.g., the surface 121) of the plate portions 120A and 120B of the inductor 10, such that the inductor 10 and the capacitor 20 can have substantially the same magnetic flux direction, and thus the inductance of the inductor 10 can be significantly increased by the arrangement of the ferromagnetic conductive layers 210A and 210B of the capacitor 20.

In some embodiments, each of the conductive layers 210A and 210B may have a thickness substantially perpendicular to the direction X, and the thickness may be from about 0.8 µm to about 1.2 µm (e.g., 0.8 µm, 0.9 µm, 1 µm, 1.1 µm or 1.2 µm). In some embodiments, the thickness of each of the conductive layers 210A and 210B may be about 1. In some embodiments, a distance between one of the conductive layers 210A and an adjacent one of the conductive layers 210B may be less than about 300 nm. In some embodiments, a distance between one of the conductive layers 210A and an adjacent one of the conductive layers 210B may be less than about 200 nm. According to some embodiments of the present disclosure, with the aforesaid design of the relatively small thickness (i.e., the distance between one of the conductive layers 210A and an adjacent one of the conductive layers 210B) of the intervening dielectric layer 220A, the capacitance of the capacitor 20 can be greatly increased.

Figure 2A:
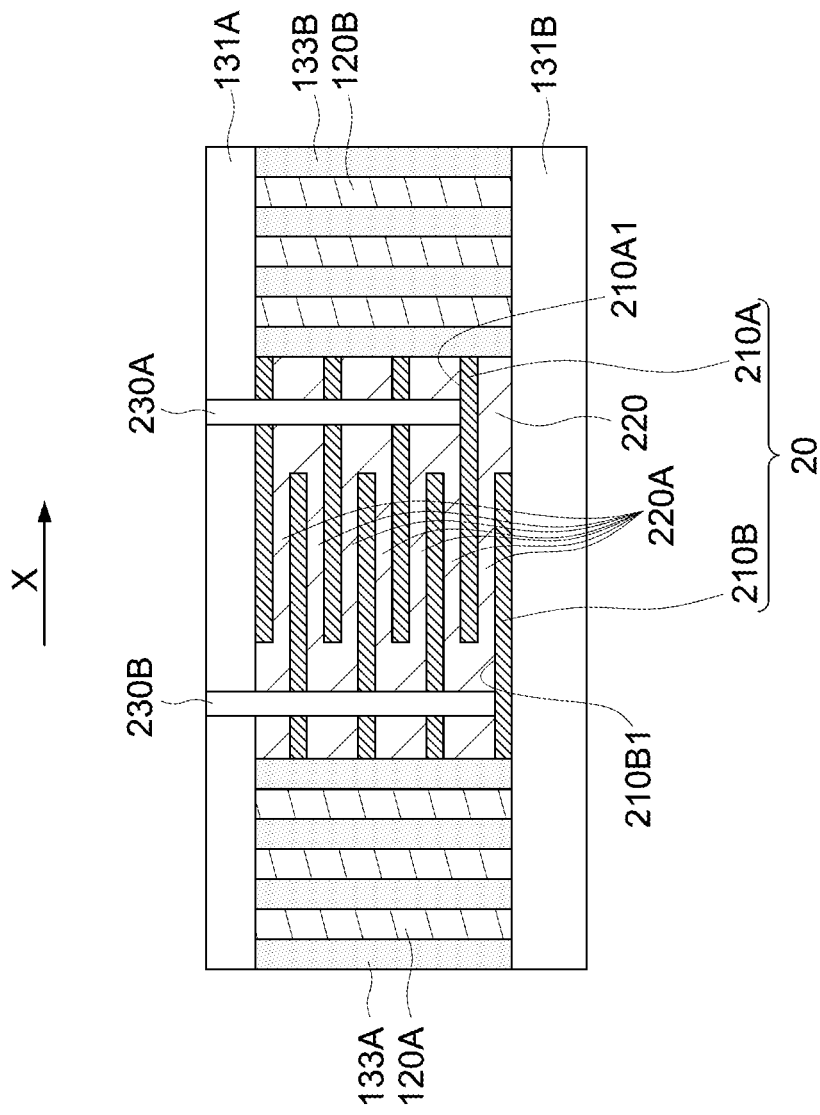
FIG. 2A illustrates a cross-sectional view of an electronic device in accordance with some embodiments of the present disclosure.

FIG. 2A illustrates a cross-sectional view of an electronic device 1 in accordance with some embodiments of the present disclosure. In some embodiments, FIG. 2A illustrates a cross-sectional view along the cross-sectional line I-I' in FIG. 1.

In some embodiments, the conductive pillar 230A electrically connects a first group of conductive layers (i.e., 210A); and the conductive pillar 230B electrically connects a second group of conductive layers (i.e., 210B). In some embodiments, the conductive pillar 230A penetrates through the conductive layers 210A and the dielectric layers 220. In some embodiments, the conductive pillar 230A directly contacts a surface 210A1 (also referred to as "an upper surface") of the bottom-most conductive layer 210A. In some embodiments, the conductive pillar 230B penetrates through the conductive layers 210B and the dielectric layers 220. In some embodiments, the conductive pillar 230B directly contacts a surface 210B1 (also referred to as "an upper surface") of the bottom-most conductive layer 210B.

Figure 2B:
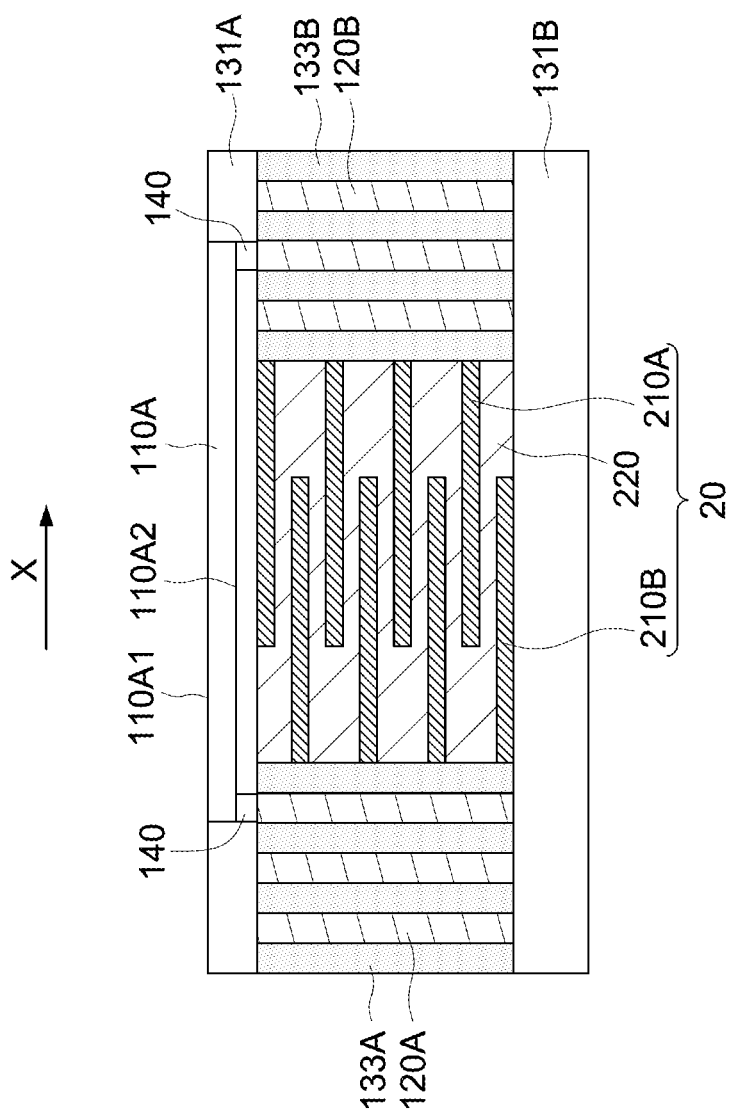
FIG. 2B illustrates a cross-sectional view of an electronic device in accordance with some embodiments of the present disclosure.

FIG. 2B illustrates a cross-sectional view of an electronic device 1 in accordance with some embodiments of the present disclosure. In some embodiments, FIG. 2B illustrates a cross-sectional view along the cross-sectional line in FIG. 1. Although the line portion 110A is embedded in the dielectric layer 131A in the embodiments illustrated in FIG. 2B, the line portion 110A may be disposed on an upper surface of the dielectric layer 131A in some other embodiments.

In some embodiments, one of the line portions 110A is connected to one of the plate portions 120A at one end and to one of the plate portions 120B at the other end, through the connecting elements 140. In some embodiments, a surface 110A1 (also referred to as "an upper surface") of the line portion 110A may be exposed from the dielectric layer 131A. In some embodiments, a surface 110A2 (also referred to as "a bottom surface") is spaced apart from the capacitor 20 by the dielectric layer 131A.

Figure 3A:
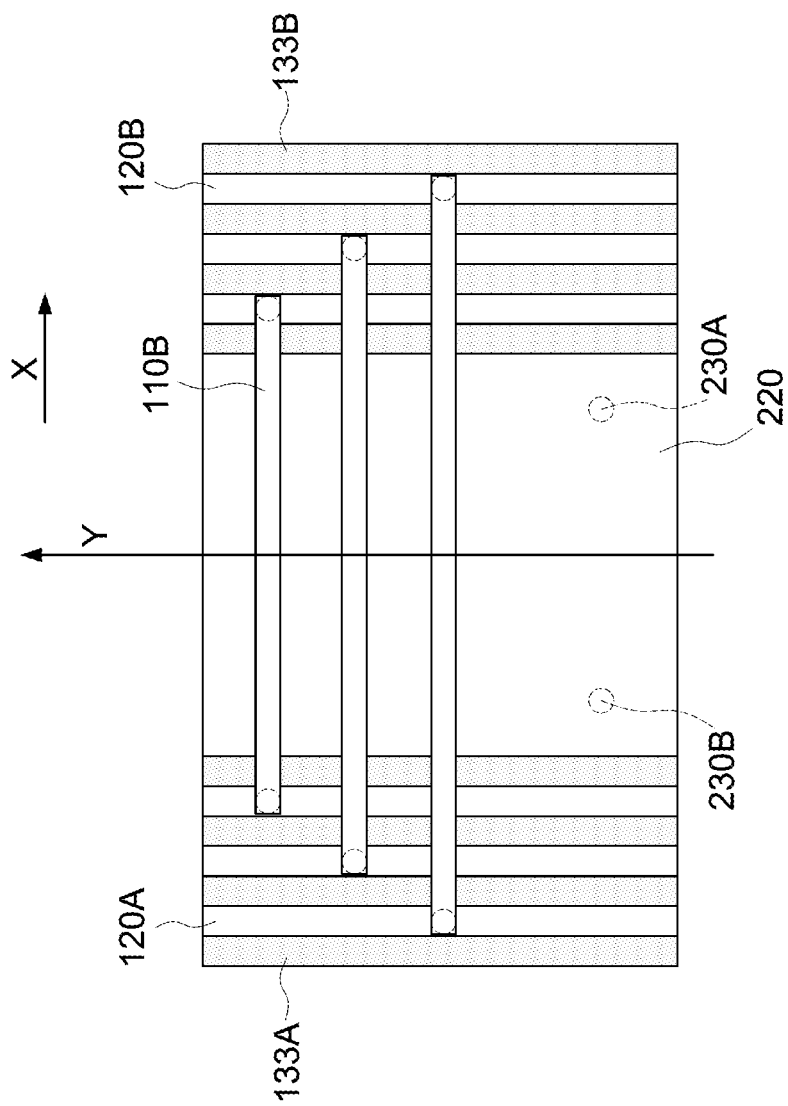
FIG. 3A illustrates a bottom view of an electronic device in accordance with some embodiments of the present disclosure.
Figure 3B:
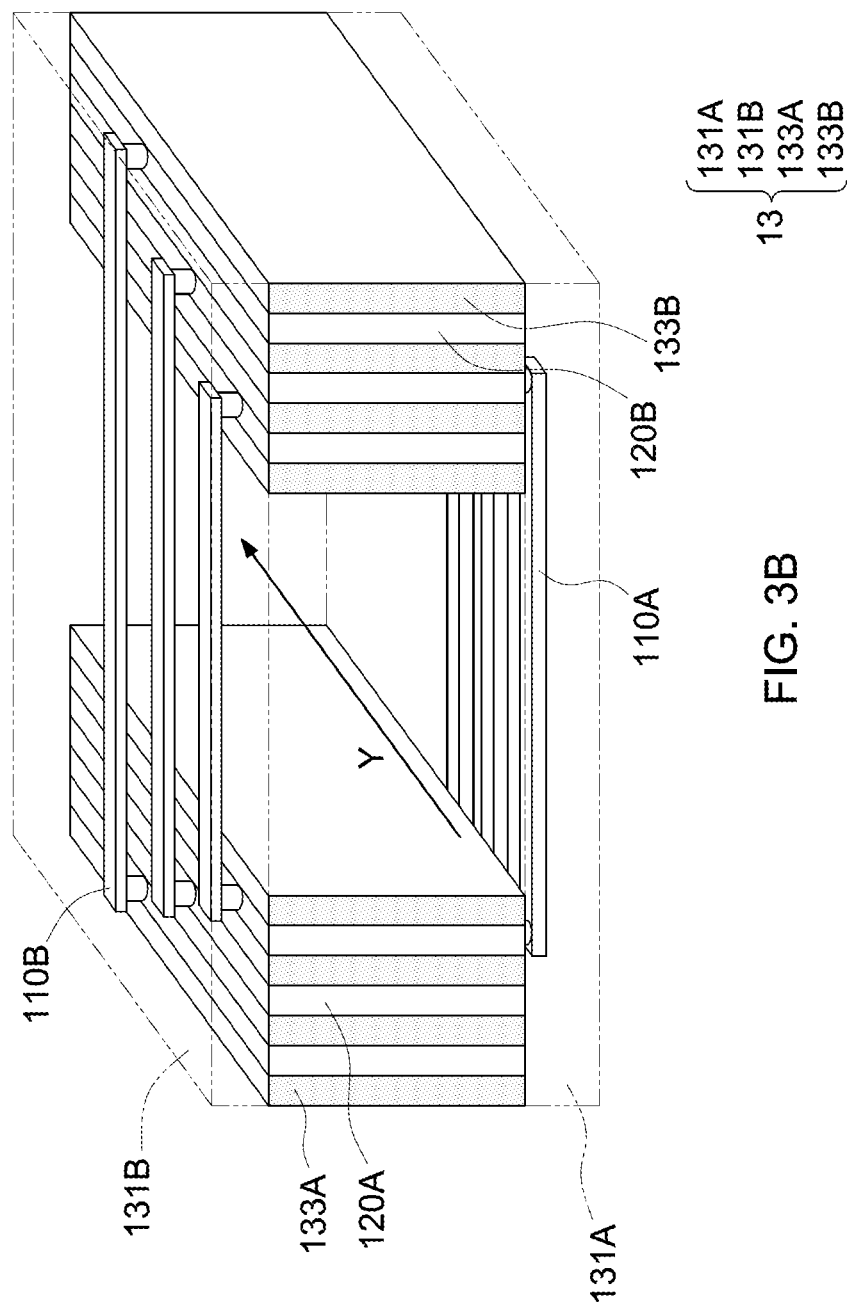
FIG. 3B illustrates a three-dimensional diagram of an inductor of an electronic device in accordance with some embodiments of the present disclosure.

FIG. 3A illustrates a bottom view of an electronic device 1 in accordance with some embodiments of the present disclosure, and FIG. 3B illustrates a three-dimensional diagram of an inductor of an electronic device in accordance with some embodiments of the present disclosure. It should be noted that some of the components in FIG. 3B are shown in a perspective view for clarity. In some embodiments, FIG. 3A and FIG. 3B illustrate the structure in FIG. 1 that is viewed from a surface where the line portions 110B and the dielectric layer 131B are disposed. It should be noted that the capacitor 20 is omitted from FIG. 3B for clarity.

In some embodiments, the line portions 110B of the inductor 10 are at substantially the same elevation. In some embodiments, the plate portions 120A the inductor 10 are separated from each other by the dielectric layers 133A and the plate portions 120B the inductor 10 are separated from each other by the dielectric layers 133B. In some embodiments, the line portions 110A of the inductor 10 are disposed on or embedded in the dielectric layer 131A. In some embodiments, the line portions 110B of the inductor 10 are disposed on or embedded in the dielectric layer 131B.

Figure 4:
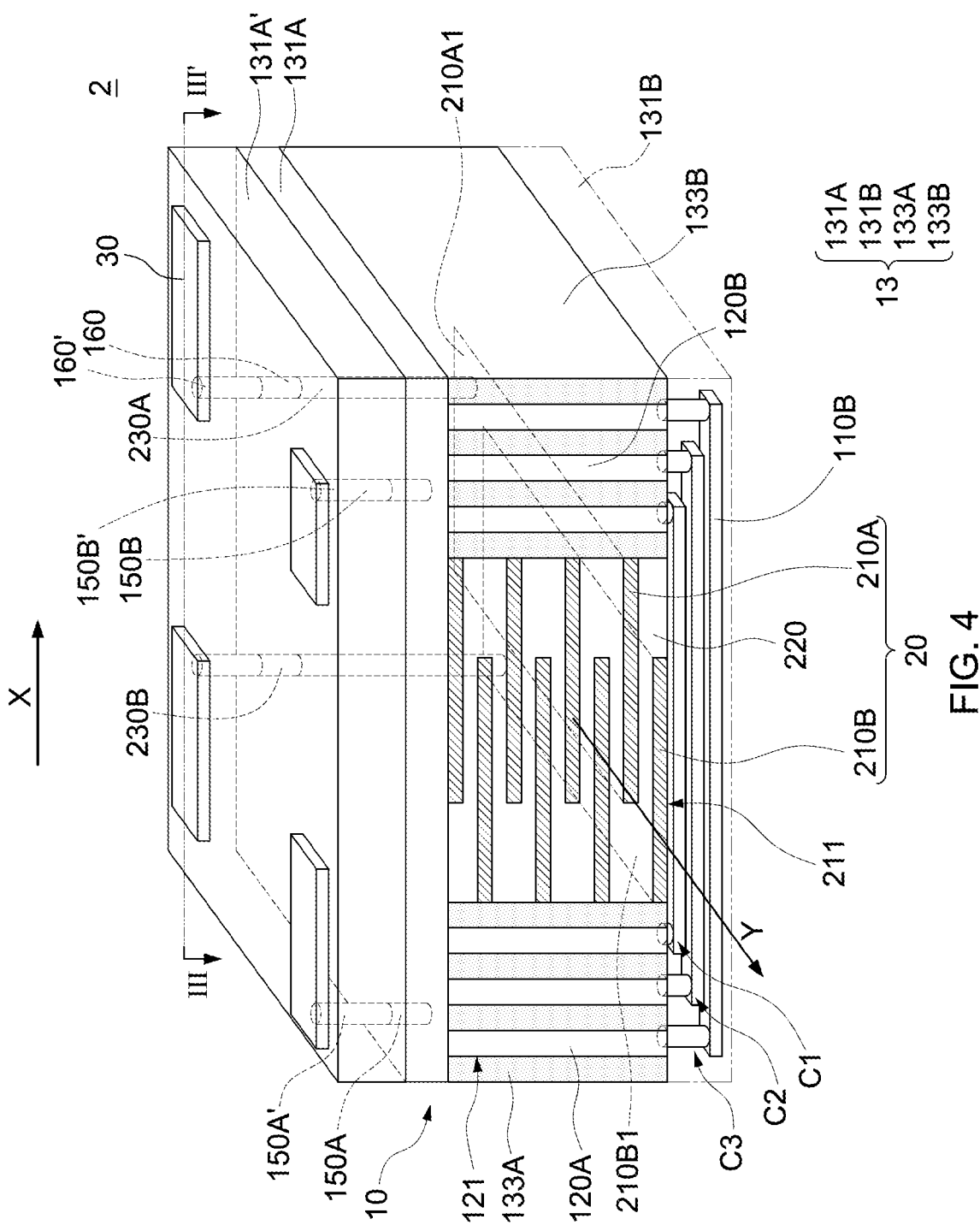
FIG. 4 illustrates a three-dimensional diagram of an electronic device in accordance with some embodiments of the present disclosure.

FIG. 4 illustrates a three-dimensional diagram of an electronic device 2 in accordance with some embodiments of the present disclosure. It should be noted that only some of the components in FIG. 4 are shown in a perspective view for clarity (for example, line portions 110A and 110B are not shown in a perspective view in FIG. 4). The electronic device 2 is similar to the electronic device 1 in FIG. 1 except that, for example, the electronic device 2 further includes a conductive pattern 30.

In some embodiments, the conductive pattern 30 is disposed over the capacitor 20. In some embodiments, the conductive pattern 30 includes a plurality of conductive lines or pads. In some embodiments, one or more conductive lines or pads of the conductive pattern 30 may be electrically connected to the conductive pillar 230A. In some embodiments, one or more conductive lines or pads of the conductive pattern 30 may be electrically connected to the conductive pillar 230B. In some embodiments, one or more conductive lines or pads of the conductive pattern 30 may be electrically connected to the terminal 150A. In some embodiments, one or more conductive lines or pads of the conductive pattern 30 may be electrically connected to the terminal 150B. In some embodiments, the conductive pattern 30 may be or include a conductive material such as a metal or metal alloy or other suitable conductive material(s). Examples include gold (Au), silver (Ag), aluminum (Al), copper (Cu), or an alloy thereof.

In some embodiments, the conductive pattern 30 is electrically connected to the conductive pillar 230A (or 230B), e.g., through the connecting element 160 penetrating the dielectric layer 131A and the connecting element 160' penetrating the dielectric layer 131A'. In some embodiments, the conductive pattern 30 is electrically connected to the terminal 150A and the terminal 150B through the connecting elements 150A' and 150B', respectively. In some embodiments, the connecting elements 160', 150A' and 150B' may be conductive vias formed within a dielectric layer (i.e., dielectric layer 131A') over the dielectric layer 131A. In some embodiments, the conductive pattern 30 may serve as input/output wiring (or a traces) for the inductor 10 and the capacitor 20. In some embodiments, the conductive pattern 30 and the dielectric layer 131A' can be viewed as a RDL structure.

Figure 4A:
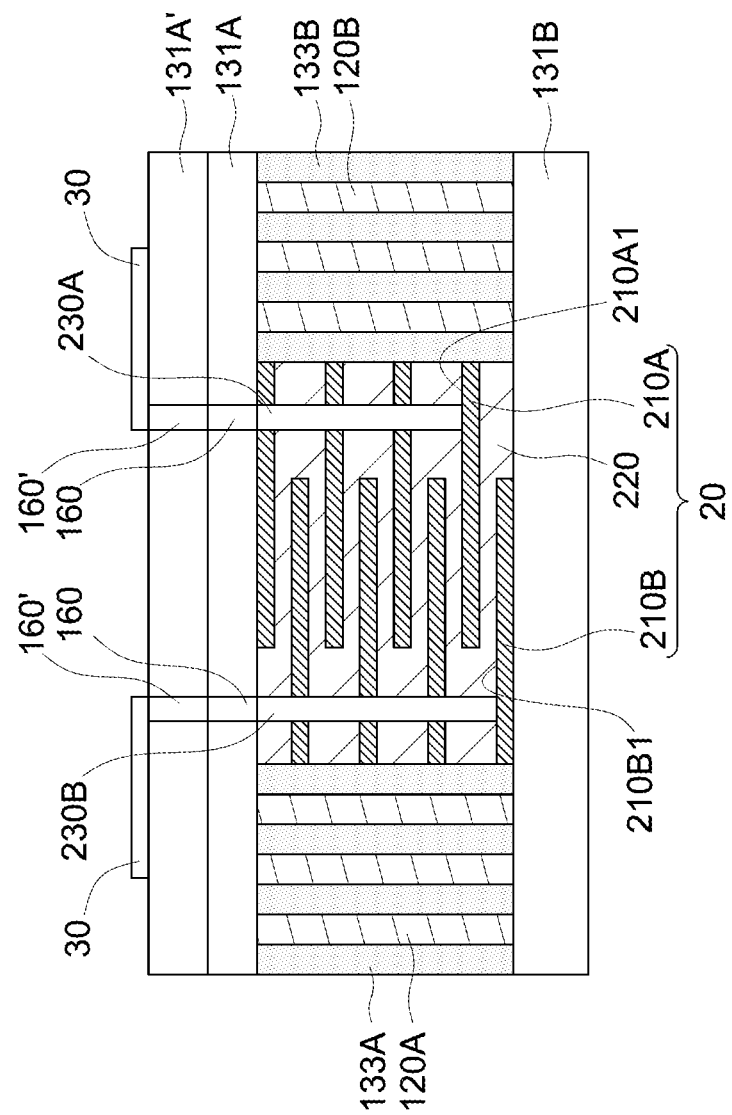
FIG. 4A illustrates a cross-sectional view of an electronic device in accordance with some embodiments of the present disclosure.

FIG. 4A illustrates a cross-sectional view of an electronic device 2 in accordance with some embodiments of the present disclosure. In some embodiments, FIG. 4A illustrates a cross-sectional view along the cross-sectional line in FIG. 4.

In some embodiments, the conductive pattern 30 is disposed on a dielectric layer 131A' that is disposed on the dielectric layer 131A. In some embodiments, referring to FIG. 1, FIG. 2B, FIG. 4 and FIG. 4A, the conductive pattern 30 and the line portions 110A and 110B of the inductor 10 are at different elevations. In some embodiments, the line portions 110A and 110B are disposed between the conductive pattern 30 and the capacitor 20. In some embodiments, the line portions 110A and 110B are disposed on or embedded in the dielectric layer 131A and spaced apart from the conductive pattern 30 by the dielectric layer 131A'. According to some embodiments of the present disclosure, the conductive pattern 30 is disposed at an elevation higher than that of the line portions 110A and 110B, which is advantageous for simplifying the process of the subsequent wiring process and increasing the design flexibility of the subsequent wiring/trace patterns.

Presented below in table 1 are experimental results of an exemplary electronic device (E1) and a comparative exemplary inductor (C1). The exemplary electronic device (E1) has the structure shown in FIG. 1 with a total thickness of about 11 µm, the coil of the inductor of the exemplary electronic device (E1) has 25 turns, the thickness of the capacitor of the exemplary electronic device (E1) is about 10 µm, and the occupied area of the capacitor of the exemplary electronic device (E1) is about 300 mm². The comparative exemplary inductor (C1) includes a copper coil surrounding a solid axial portion. The total volume of the comparative exemplary inductor (C1) is 3.68 mm×3.05 mm×3.18 mm. The operating frequency for the exemplary electronic device (E1) and the comparative exemplary inductor (C1) is 300 MHz.

TABLE 1

|  | E1 | | C1 |
| --- | --- | --- | --- |
|  | Inductor | Capacitor |  |
| Inductance L (nH) | 75 | N/A | 33 |
| Q value | 41 | N/A | 70 |
| capacitance | N/A | 1.4 mF/mm² | N/A |

From table 1 it is apparent that the inductor of the exemplary electronic device (E1) has a greater inductance and a smaller size, compared to that of the comparative exemplary inductor (C1). In addition, the exemplary electronic device (E1) has a relatively small size compared to that of the comparative exemplary inductor (C1), yet it further includes an additional component, e.g., the capacitor. Therefore, accordingly to some embodiments of the present disclosure, the electronic device can be provided with greater inductance and includes additional component(s) such as a capacitor, while still having a relatively small size/volume.

FIG. 5A, FIG. 5B, FIG. 5C, FIG. 5D, FIG. 5E, FIG. 5F, FIG. 5G, FIG. 5H and FIG. 5I illustrate various operations in a method of manufacturing an electronic device in accordance with some embodiments of the present disclosure.

Figure 5A:
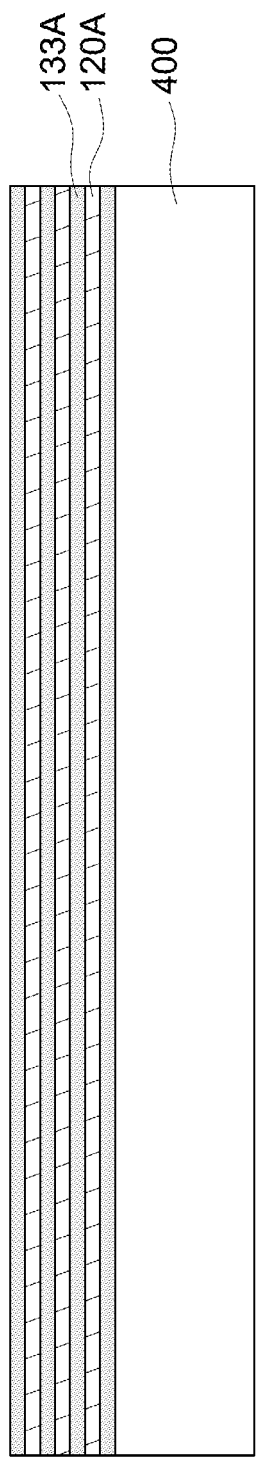
FIG. 5A, FIG. 5B, FIG. 5C, FIG. 5D, FIG. 5E, FIG. 5F, FIG. 5G, FIG. 5H and FIG. 5I illustrate various operations in a method of manufacturing an electronic device in accordance with some embodiments of the present disclosure.

Referring to FIG. 5A, a stack of conductive layers 120A and dielectric layers 133A are formed. In some embodiments, the conductive layers 120A and dielectric layers 133A are arranged alternatingly. In some embodiments, the conductive layers 120A and dielectric layers 133A are formed on a carrier 400.

Figure 5B:
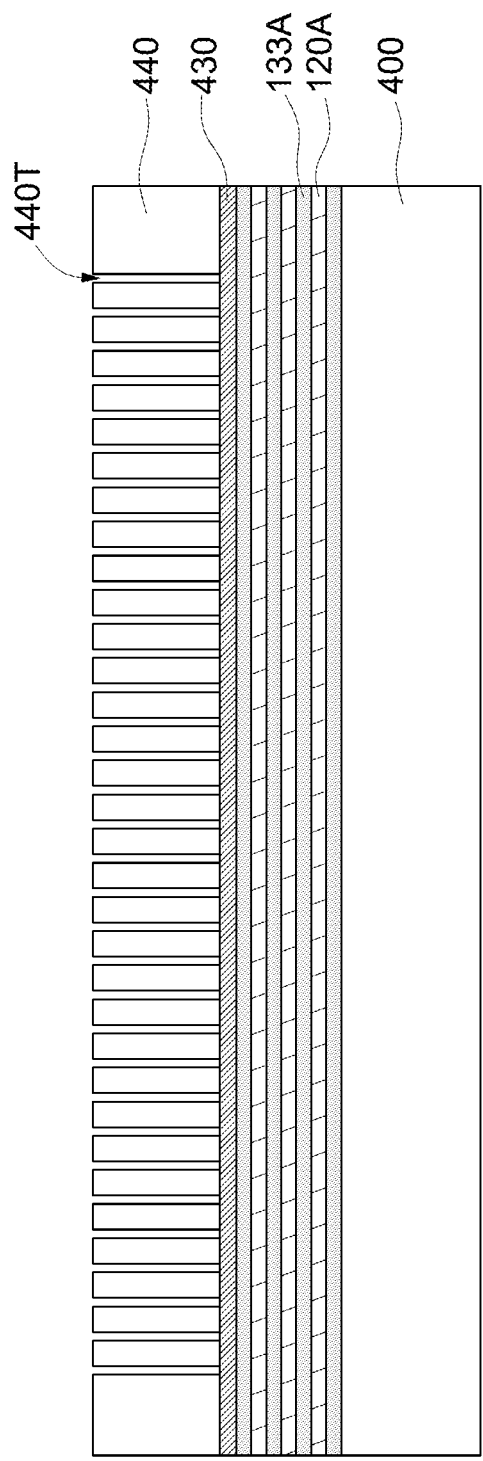

Referring to FIG. 5B, a seed layer 430 is formed on the uppermost dielectric layer 133A, and a patterned photoresist 440 is formed on the seed layer 430. The patterned photoresist 440 includes trenches 440T exposing portions of the seed layer 430.

Figure 5C:
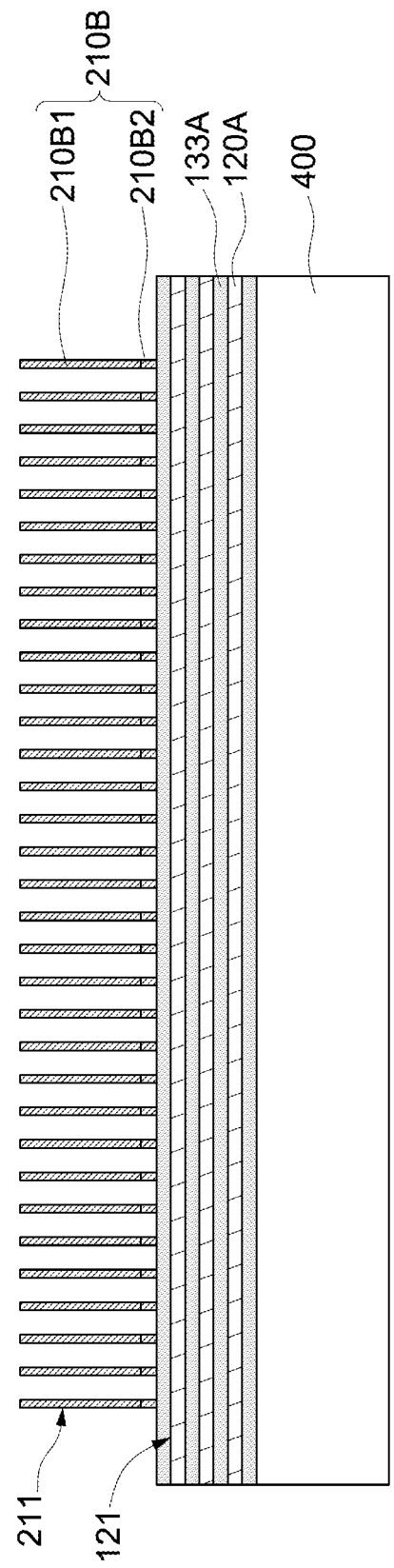

Referring to FIG. 5C, a plurality of conductive layers 210B are formed on the stack of conductive layers 120A and dielectric layers 133A. In some embodiments, the conductive layers 210B may be formed by the following operations: forming a conductive material in the trenches 440T, and then removing the patterned photoresist 440 and portions of the seed layer 440 directly under the patterned photoresist 440. The conductive material may be formed by plating. In some embodiments, each of the as-formed conductive layers 210B may include a portion 210B1 and a portion 210B2 between the portion 210B1 and the dielectric layer 133A. In some embodiments, each of the portions 210B1 of the conductive layers 210B are formed of the conductive material, and each of the portions 210B2 of the conductive layer 210B are formed from each of the remained portions of the seed layer 440. In some embodiments, surfaces 211 of the conductive layers 210B are substantially perpendicular to surfaces 121 of the conductive layers 120A of the first stack.

Figure 5D:
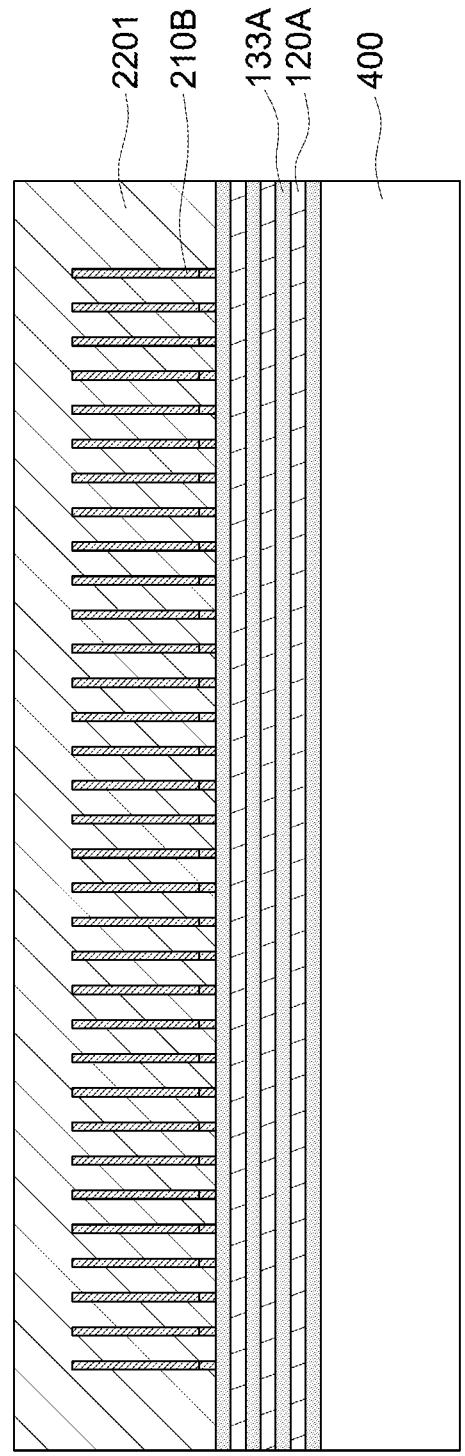

Referring to FIG. 5D, a dielectric structure 2201 is formed to cover the conductive layers 210B. In some embodiments, the conductive layers 210B are fully embedded in the dielectric structure 2201. The dielectric structure 2201 may be formed by a deposition process, for example, a chemical vapor deposition (CVD) process or a physical vapor deposition (PVD) process. It is to be noted that the detailed structures of the portions 210B1 and 210B2 of the conductive layers 210B are omitted in the following drawings for clarity.

Figure 5E:
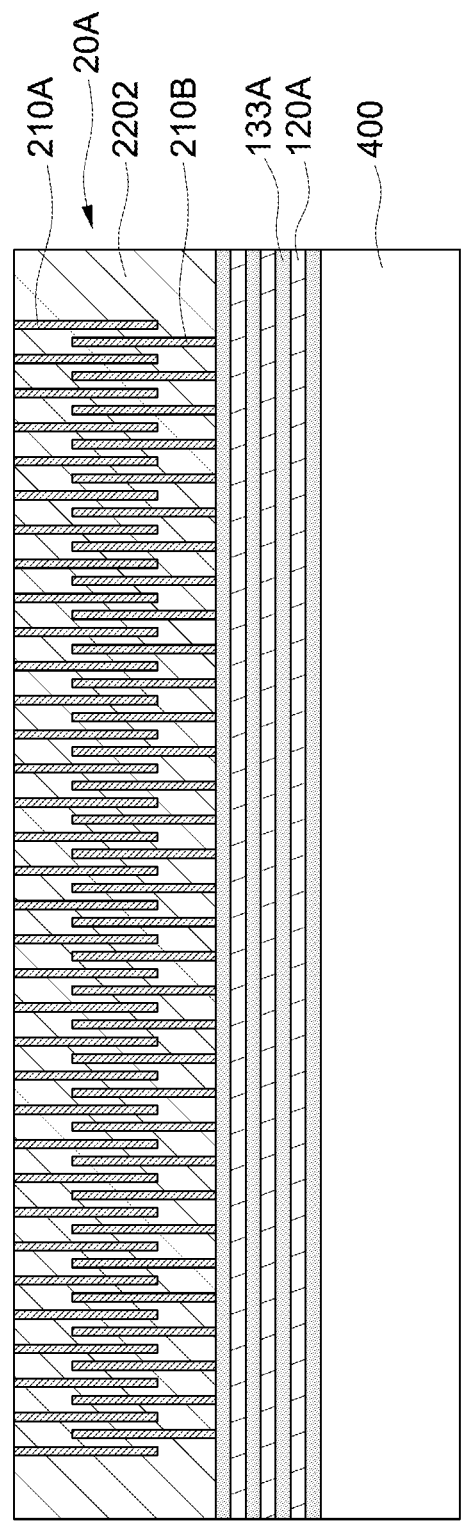

Referring to FIG. 5E, a plurality of trenches are formed in the dielectric structure 2201. Each of the trenches is formed between two adjacent conductive layers 210B. A conductive material is filled in the trenches to form a plurality of conductive layers 210A. The conductive layers 210B are electrically isolated from the conductive layers 210A by the dielectric structure 2202. The trenches may be formed by an etching process, for example, a deep reactive-ion etching (DRIE) process. The conductive material may be filled in the trenches by a plating process or a sputtering process. In some embodiments, the conductive layers 210A are spaced apart from the stack of conductive layers 120A and dielectric layers 133A by the as-formed dielectric structure 2202. In some embodiments, the conductive layers 210A and 210B and the dielectric structure 2202 construct a capacitor structure 20A on the stack of conductive layers 120A and dielectric layers 133A.

Figure 5F:
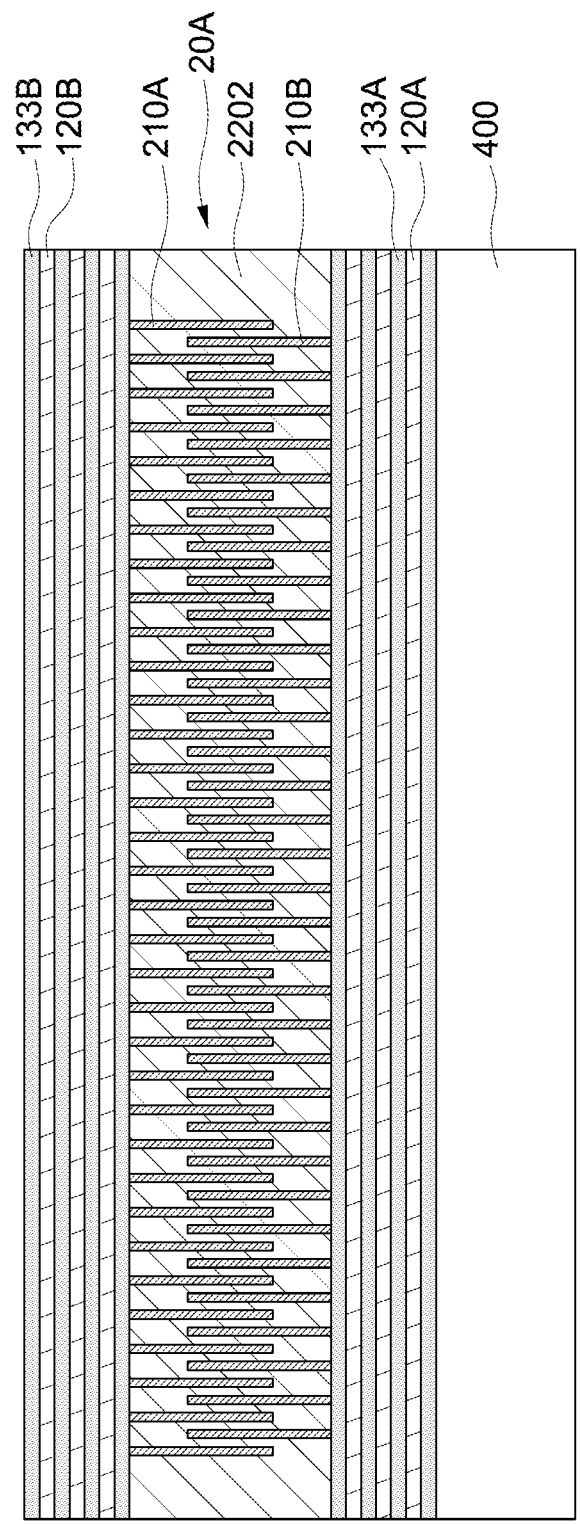

Referring to FIG. 5F, a stack of conductive layers 120B and dielectric layers 133B are formed on the aforesaid capacitor structure 20A. In some embodiments, the capacitor structure 20A is between the stack of conductive layers 120A and dielectric layers 133A and the stack of conductive layers 120B and dielectric layers 133B.

Figure 5G:
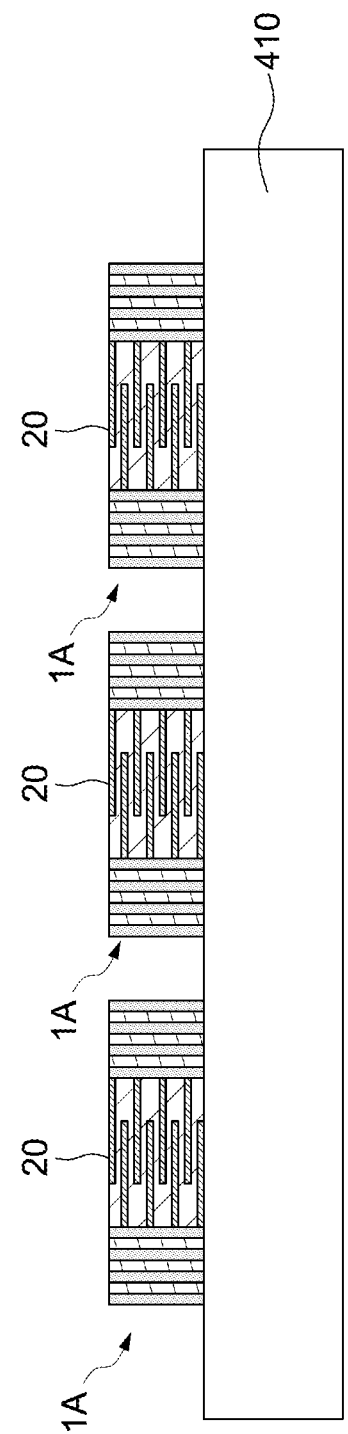

Referring to FIG. 5G, a singulation operation is performed on the stack of conductive layers 120A and dielectric layers 133A, the capacitor structure 20A, and the stack of conductive layers 120B and dielectric layers 133B, so as to form a plurality of singulated structures 1A. The singulation operation may be performed, for example, by using a dicing saw, laser or other appropriate cutting technique. Next, the singulated structures 1A are removed from the carrier 400, rotated by 90 degrees and then disposed on another carrier 410. In some embodiments, the singulated capacitor structure 20 directly contacts the carrier 410. In some embodiments, the carrier 410 is or includes an adhesive layer.

Figure 5H:
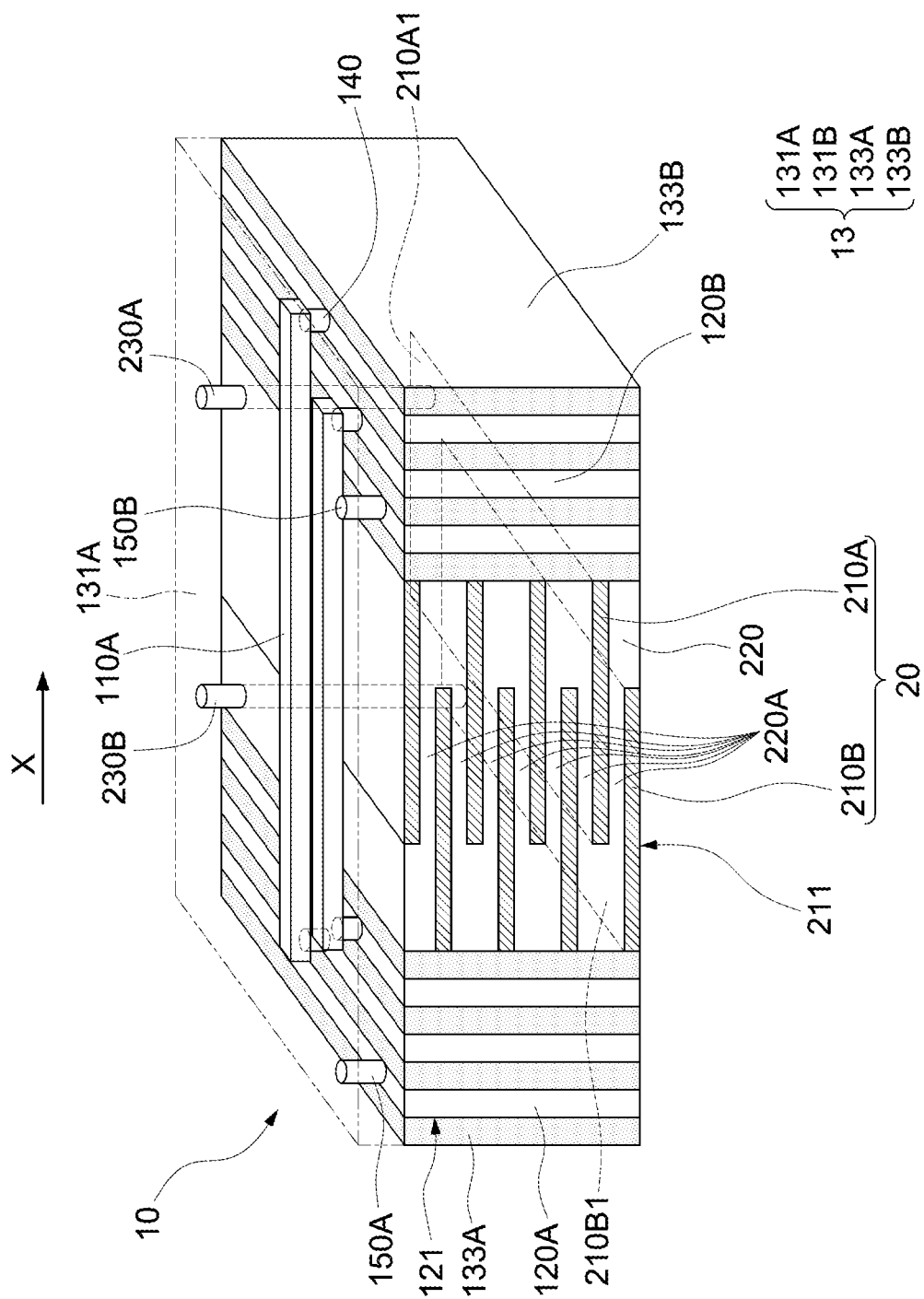

Referring to FIG. 5H, a plurality of conductive lines (i.e., line portions 110A) are formed to electrically connect the conductive layers 120A and the conductive layers 120B. In some embodiments, the dielectric layer 131A is formed on the conductive layers 120A and 120B, the dielectric layers 133A and 133B, and the capacitor 20. In some embodiments, connecting elements 140 are formed on the conductive layers 120A and the conductive layers 120B. In some embodiments, terminals 150A and 150B are formed on one of the conductive layers 120A and one of the conductive layers 120B, respectively. In some embodiments, forming the connecting elements 140 and forming the terminals 150 are performed in the same operation. In some embodiments, a plurality of openings are formed within the dielectric layer 131A at predetermined positions, and then a conductive material is filled in the openings to form the connecting elements 140 and the terminals 150. In some embodiments, each of the conductive lines (i.e., the line portions 110A) is formed on one connecting element 140 on one of the conductive layers 120A and one connecting element 140 on one of the conductive layers 120B.

In some embodiments, a conductive pillar 230B is formed to pass through the conductive layers 210B, and a conductive pillar 230A is formed to pass through the conductive layers 210A. In some embodiments, the conductive pillars 230A and 230B are formed in the same operation. In some embodiments, the conductive pillars 230A and 230B are formed prior to forming the dielectric layer 131A.

Figure 5I:
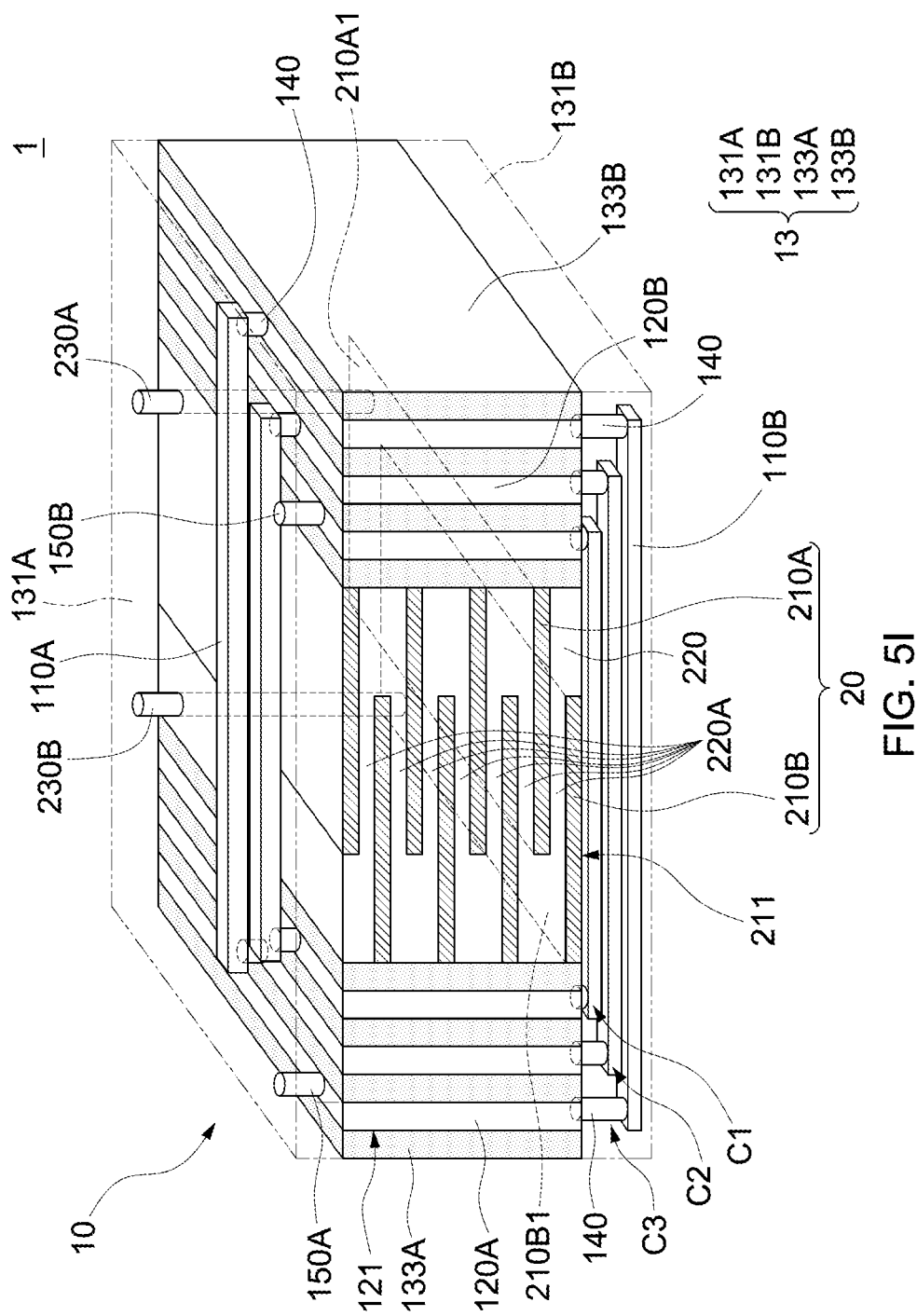

Referring to FIG. 5I, a plurality of conductive lines (i.e., line portions 110B) are formed. In some embodiments, the conductive lines (i.e., the line portions 110B) are electrically connecting the conductive layers 120A and the conductive layers 120B. In some embodiments, forming the conductive pillar 230B and the conductive pillar 230A is prior to forming the conductive lines (i.e., the line portions 110A and 110B). In some embodiments, the singulation operation is performed prior to forming the conductive lines (i.e., the line portions 110A and 110B).

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An electronic device, comprising:
   an inductor, comprising:
   a plurality of line portions and a plurality of plate portions connected to the plurality of line portions, wherein the line portions and the plate portions form a coil concentric to a horizontal axis; and
   a first terminal and a second terminal connected to respective ones of the plurality of plate portions.

2. The electronic device as claimed in claim 1, wherein the line portions and the plate portions are arranged alternatingly around the horizontal axis.

3. An electronic device, comprising:
   an inductor, comprising:
   a plurality of line portions and a plurality of plate portions connected to the plurality of line portions, wherein the line portions and the plate portions form a coil concentric to a horizontal axis,
   wherein the line portions have a first width along the horizontal axis, the plate portions have a second width along the horizontal axis, and the second width is greater than the first width.

4. The electronic device as claimed in claim 1, wherein the inductor further comprises:
   a dielectric structure, wherein the line portions are separated from each other by the dielectric structure and the plate portions are separated from each other by the dielectric structure.

5. The electronic device as claimed in claim 1, wherein the inductor further comprises:
   a plurality of connecting elements contacting one of the line portions and one of the plate portions.

6. The electronic device as claimed in claim 1, further comprising:
   a plurality of ferromagnetic conductive layers and a plurality of ferromagnetic dielectric layers stacked alternatingly and surrounded by the coil of the inductor.

7. An electronic device, comprising:
- an inductor comprising a coil concentric to a horizontal axis; and
- a capacitor contacting the inductor, wherein the capacitor is surrounded by the coil of the inductor, wherein the capacitor comprises a plurality of ferromagnetic conductive layers and a plurality of ferromagnetic dielectric layers stacked alternatingly.

8. The electronic device as claimed in claim 7, wherein the inductor further comprises a dielectric structure, the coil is embedded in the dielectric structure, and the capacitor directly contacts the dielectric structure of the inductor.

9. The electronic device as claimed in claim 7, wherein the inductor comprises a plurality of line portions and a plurality of plate portions connected to the plurality of line portions, and the line portions and the plate portions form the coil.

10. The electronic device as claimed in claim 9, wherein the capacitor comprises a first group of conductive layers, a second group of conductive layers and a further dielectric structure wherein the first group of conductive layers and the second group of conductive layers are stacked alternatingly and separated by the further dielectric structure, and wherein a surface of the conductive layers of the capacitor is substantially perpendicular to a surface of the plate portions of the inductor.

11. The electronic device as claimed in claim 10, wherein the capacitor further comprises a first conductive pillar electrically connecting a first group of the conductive layers and a second conductive pillar electrically connecting a second group of the conductive layers.

12. The electronic device as claimed in claim 11, wherein the first conductive pillar and the second conductive pillar are surrounded by the coil of the inductor.

13. The electronic device as claimed in claim 11, further comprising a conductive pattern disposed over the capacitor and electrically connected to the first conductive pillar, wherein the conductive pattern and the line portions of the inductor are at different elevations.

14. The electronic device as claimed in claim 7, wherein the ferromagnetic conductive layers and the ferromagnetic dielectric layers are surrounded by the coil of the inductor.

15. The electronic device as claimed in claim 7, wherein
- the capacitor has a first side, a second side opposite to the first side, a third side extending between the first side and the second side, and a fourth side opposite to the third side, and
- the inductor comprises a plurality of line portions and a plurality of plate portions, the line portions are disposed at the first side and the second side of the capacitor, and the plate portions are disposed at the third side and the fourth side of the capacitor.

16. The electronic device as claimed in claim 15, wherein at least two line portions of the plurality of line portions are at different elevations with respect to the first side of the capacitor.

17. The electronic device as claimed in claim 11, wherein a first end of the first conductive pillar and a first end of the second conductive pillar are at substantially the same elevation with respect to the surface of the conductive layers, and a second end of the first conductive pillar and a second end of the second conductive pillar are at different elevations with respect to the surface of the conductive layers.

18. The electronic device as claimed in claim 11, wherein the plurality of line portions are parallel to each other along a first direction that is substantially parallel to the surface of the conductive layers, and lengths of the line portions gradually decrease along a second direction that is substantially perpendicular to the first direction.

* * * * *